Patented Jan. 15, 1946

2,392,814

UNITED STATES PATENT OFFICE 2,392,814

STRONTIUM ALUMINATE PHOSPHOR

Herman C. Froelich, Cleveland, Ohio, assignor to General Electric Company, a corporation of New York No Drawing. Application August 12, 1943, Serial No. 498,404

7 Claims. (Cl. 252—301.4)

This invention relates to a combination of a luminescent material or phosphor with a source of exciting radiation, and particularly to a new phosphor. Phosphors consist in general of a major proportion of a so-called base material or matrix and a minor proportion of another material called an activator. The radiation of a phosphor when excited depends on the relations between matrix and activator materials, as largely determined by heat-treatment which they undergo together, as well as on the materials themselves and their relative proportions. Apparently it is the metal of an activator material that determines its effect in a phosphor, although this metal is usually present as a compound.

I have found that a strontium aluminate matrix material can be activated with manganese to give a very bright red fluorescence when excited by long-wave ultraviolet radiation, such as 3650 A., and an orange fluorescence when excited by cathode rays. Strontium aluminate is thus unique in its class; for calcium aluminate, as I have found, gives only weak fluorescence when activated with manganese, while barium aluminate is very weak. The phosphor shows substantially no response to short-wave ultraviolet such as 2537 A., or even no response at all.

The mol ratio of SrO to $Al_2O_3$ in the phosphor may be varied; indeed, variation is advisable to give optimum brightness under different exciting agents. For ultraviolet excitation, it should be compounded to have an excess of alumina ($Al_2O_3$) over the stoichiometric proportions according to the formula $SrAl_2O_4$, such as about 3 mols SrO to 5 mols $Al_2O_3$. For cathode ray excitation, on the other hand, the stoichiometric ratio of 1 mol SrO to 1 mol $Al_2O_3$ is preferable. The amount of activating manganese is critical, and should be rather small, such as a minor fractional percentage of the order of 0.001 per cent to 0.1 per cent of the residual product or phosphor formed by the heating: the amount that seems to yield the maximum fluorescence is about 0.05 per cent. With as much as 1 per cent of manganese, the product shows substantially no response to long-wave ultraviolet, and only a faint response to cathode rays; with 0.5 per cent, even, the response to long-wave ultraviolet is extremely weak. The explanation of this peculiarity seems to lie in low solubility of MnO in $SrAl_2O_4$.

A simple and convenient way of preparing the phosphor is by thermal synthesis of ingredients comprising SrO, $Al_2O_3$, and MnO, such as $SrCO_3$ or $SrSO_4$, $Al_2O_3$ or $Al(NO_3)_2$, and $Mn(NO_3)_2$. A flux such as aluminum fluoride, $AlF_3$, may be included in the batch, especially when $SrCO_3$ is used, since without flux $SrCO_3$ does not seem to give a bright phosphor. However, phosphor excited by cathode rays does not show maximum brightness when prepared with flux; and in this case $SrSO_4$ should be preferred to $SrCO_3$, and should be used without flux.

A suitable formula for the preparation of phosphor intended for long-wave ultraviolet excitation is as follows:

| | Grams |
|---|---|
| Strontium carbonate, $SrCO_3$ | 45 |
| Aluminum oxide, $Al_2O_3$ | 51 |
| Manganese nitrate, $Mn(NO_3)_2$, sufficient to yield of MnO | 0.041 |
| Aluminum fluoride $AlF_3$ | 4.1 |

The strontium carbonate and alumina may be thoroughly mixed together dry, which may be assured by ball-milling the mix for about ½ hour. The resulting dry mixture may then be wet down to a slurry or paste with a water solution of the manganese nitrate and the aluminum fluoride. The resulting paste may be dried until all its water and volatile matter ($NO_2$, $CO_2$) are expelled or evaporated off, and the dry powder may be again ball-milled for about ½ hour. The batch may then be heated or calcined in air in a refractory crucible (as of silica or alundum) heated in a refractory electric muffle furnace, for a period of some 1 to 2 hours and at a temperature of the order of 1100° C. After cooling, the batch may be sieved through a screen of some 100 mesh; or it may be washed in distilled water, dried, and then sieved through a screen of some 100 mesh. The product is then ready for use. It may be applied to the enclosure, tube, or envelope on which it is used with the aid of a carbonaceous binder in the usual way, though any ball-milling to incorporate the powder in the binder should preferably be brief.

What I claim as new and desire to secure by Letters Patent of the United States is:

1. A phosphor consisting essentially of a strontium aluminate matrix activated with a minor proportion of manganese, characterized by red fluorescence under long-wave ultraviolet excitation, and by orange fluorescence under cathode rays.

2. A phosphor as set forth in claim 1 containing an excess of alumina over stoichiometric proportions and activated with a fractional percentage of manganese, and characterized by bright red fluorescence under long-wave ultraviolet excitation.

3. A phosphor as set forth in claim 1 containing strontia and alumina in substantially stoichiometric proportions and activated with a fractional percentage of manganese, and characterized by bright orange fluorescence under cathode ray excitation.

4. A phosphor composed substantially of a strontium aluminate matrix activated with a fractional percentage of manganese between 0.001 and 0.11 per cent.

5. The method of preparing a strontium aluminate phosphor activated with manganese which comprises heating together, at a temperature of the order of 1100° C., ingredients comprising essentially SrO and $Al_2O_3$, along with an activating compound of manganese containing manganese in the proportion of substantially 0.001 per cent to 0.11 per cent of the residual product.

6. The method of preparing a strontium aluminate phosphor activated with manganese which comprises heating together at activating temperature ingredients comprising essentially $Al_2O_3$ and $SrCO_3$, along with an activating compound of manganese containing manganese in the proportion of a fractional percentage of the residual product, and a flux.

7. The method of preparing a strontium aluminate phosphor activated with manganese which comprises heating together at activating temperature ingredients comprising essentially $Al_2O_3$ and $SrSO_4$, along with an activating compound of manganese containing manganese in the proportion of a fractional percentage of the residual product.

HERMAN C. FROELICH.